(12) United States Patent
Chasman et al.

(10) Patent No.: US 7,606,881 B2
(45) Date of Patent: Oct. 20, 2009

(54) SYSTEM AND METHOD FOR SYNCHRONIZATION OF VERSION ANNOTATED OBJECTS

(75) Inventors: Doug Chasman, Sonora, CA (US); Joel Heinke, Livermore, CA (US); Jeff Parrett, Pleasanton, CA (US); Bruce Shay, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 685 days.

(21) Appl. No.: 10/133,164

(22) Filed: Apr. 25, 2002

(65) Prior Publication Data

US 2007/0180075 A1 Aug. 2, 2007

(51) Int. Cl.
*G06F 15/177* (2006.01)
(52) U.S. Cl. ..................................... 709/221
(58) Field of Classification Search ................. 709/205, 709/213, 221; 707/203
See application file for complete search history.

(56) References Cited

U.S. PATENT DOCUMENTS

| | | | |
|---|---|---|---|
| 5,499,371 A | 3/1996 | Henninger et al. | |
| 5,694,598 A | 12/1997 | Durand et al. | |
| 5,710,922 A | 1/1998 | Alley et al. | |
| 5,729,735 A * | 3/1998 | Meyering | 707/10 |
| 5,758,337 A | 5/1998 | Hammond | |
| 5,862,325 A * | 1/1999 | Reed et al. | 709/201 |
| 5,905,988 A | 5/1999 | Schwartz et al. | |
| 5,937,409 A | 8/1999 | Wetherbee | |
| 6,039,624 A | 3/2000 | Holmes | |
| 6,240,422 B1 | 5/2001 | Atkins et al. | |
| 6,272,545 B1 | 8/2001 | Flanagin et al. | |
| 6,317,754 B1 * | 11/2001 | Peng | 707/203 |
| 6,324,544 B1 * | 11/2001 | Alam et al. | 707/201 |
| 6,393,434 B1 * | 5/2002 | Huang et al. | 707/200 |
| 6,442,570 B1 | 8/2002 | Wu | |
| 6,505,200 B1 * | 1/2003 | Ims et al. | 707/8 |
| 6,539,381 B1 * | 3/2003 | Prasad et al. | 707/10 |
| 6,608,556 B2 | 8/2003 | De Moerloose et al. | |
| 6,611,537 B1 | 8/2003 | Edens et al. | |
| 6,633,924 B1 * | 10/2003 | Wu et al. | 719/328 |
| 6,636,897 B1 | 10/2003 | Sherman et al. | |

(Continued)

FOREIGN PATENT DOCUMENTS

WO    WO 98/05176 A2    2/1998

OTHER PUBLICATIONS

U.S. Appl. No. 10/133,124, Doug Chasman, Simplified Application Object Data Synchronization for Optimized Data Storage, filed Apr. 25, 2002.

(Continued)

*Primary Examiner*—Andrew Caldwell
*Assistant Examiner*—Benjamin Ailes
(74) *Attorney, Agent, or Firm*—Townsend and Townsend and Crew LLP (57) ABSTRACT

Objects in a master database and objects in a replicated database are synchronized using identifiers and version stamps of the objects. Each object has a unique identifier and a version stamp that is incremented when the object is updated at the master database. A synchronization server uses the identifiers and version stamps of objects to perform out-of-date detection and conflict detection. The synchronization server resolves update conflicts according to rules.

45 Claims, 7 Drawing Sheets

U.S. PATENT DOCUMENTS

| | | | |
|---|---|---|---|
| 6,674,445 B1 | 1/2004 | Chithambaram et al. | |
| 6,707,811 B2 | 3/2004 | Greenberg et al. | |
| 6,823,373 B1 | 11/2004 | Pancha et al. | |
| 6,862,617 B1 * | 3/2005 | Wu | 709/224 |
| 6,910,052 B2 * | 6/2005 | Gates et al. | 707/201 |
| 6,928,467 B2 * | 8/2005 | Peng | 709/219 |
| 6,968,209 B1 * | 11/2005 | Ahlgren et al. | 455/558 |
| 6,990,523 B2 * | 1/2006 | Wu | 709/224 |
| 7,039,656 B1 * | 5/2006 | Tsai et al. | 707/201 |
| 7,047,259 B1 | 5/2006 | Chasman et al. | |
| 7,076,567 B1 | 7/2006 | Chasman et al. | |
| 7,127,477 B2 * | 10/2006 | Duncombe et al. | 707/203 |
| 7,127,679 B2 | 10/2006 | Cohen | |
| 7,143,092 B1 * | 11/2006 | Gregorat | 707/8 |
| 7,149,761 B2 * | 12/2006 | Cooke et al. | 707/203 |
| 7,149,813 B2 * | 12/2006 | Flanagin et al. | 709/248 |
| 7,185,364 B2 | 2/2007 | Knouse et al. | |
| 7,209,949 B2 | 4/2007 | Mousseau et al. | |
| 7,213,039 B2 * | 5/2007 | Ramanujam et al. | 707/203 |
| 7,310,653 B2 | 12/2007 | Coyle et al. | |
| 7,363,022 B2 | 4/2008 | Whelan et al. | |
| 7,451,163 B2 * | 11/2008 | Selman et al. | 707/200 |
| 2001/0038624 A1 | 11/2001 | Greenberg et al. | |
| 2002/0033843 A1 | 3/2002 | Loos et al. | |
| 2002/0050927 A1 | 5/2002 | De Moerloose et al. | |
| 2002/0057803 A1 | 5/2002 | Loos et al. | |
| 2002/0123898 A1 | 9/2002 | Lemay et al. | |
| 2002/0133507 A1 * | 9/2002 | Holenstein et al. | 707/200 |
| 2003/0004983 A1 | 1/2003 | Cohen | |
| 2003/0074580 A1 | 4/2003 | Knouse et al. | |
| 2003/0130984 A1 * | 7/2003 | Quinlan et al. | 707/1 |
| 2003/0159136 A1 | 8/2003 | Huang et al. | |
| 2004/0198319 A1 | 10/2004 | Whelan et al. | |
| 2004/0225731 A1 | 11/2004 | Piispanen et al. | |
| 2005/0125459 A1 | 6/2005 | Sutinen et al. | |
| 2005/0180464 A1 | 8/2005 | McConnell et al. | |
| 2005/0283445 A1 | 12/2005 | Trinon et al. | |
| 2006/0031237 A1 | 2/2006 | DeAnna et al. | |
| 2006/0117073 A1 | 6/2006 | Bosworth et al. | |
| 2006/0248232 A1 | 11/2006 | Chasman et al. | |
| 2007/0016695 A1 | 1/2007 | Rabbers et al. | |
| 2007/0177571 A1 | 8/2007 | Caulfield et al. | |
| 2007/0220065 A1 * | 9/2007 | Coyle et al. | 707/203 |
| 2007/0244981 A1 | 10/2007 | Malden et al. | |
| 2008/0288874 A1 | 11/2008 | Hoyle | |

OTHER PUBLICATIONS

U.S. Appl. No. 10/183,144, Doug Chasman, Rich Cross Object Navigation in Mobile Applications, filed Jun. 25, 2002.
U.S. Appl. No. 10/133,124, filed Apr. 25, 2002, Chasman et al.
U.S. Appl. No. 10/183,144, filed Jun. 25, 2002, Heinke.
U.S. Appl. No. 10/266,824, filed Oct. 7, 2002, Caulfield et al.

* cited by examiner

SYSTEM AND METHOD FOR SYNCHRONIZATION OF VERSION ANNOTATED OBJECTS

CROSS-REFERENCE TO RELATED APPLICATION

This application is related to U.S. patent application Ser. No. 10/133,124, entitled "Simplified Application Object Data Synchronization for Optimized Data Storage," filed on Apr. 25, 2002, now U.S. Pat. No. 7,076,567. The subject mailer of the related application is hereby incorporated by reference.

BACKGROUND OF THE INVENTION

1. Field of the Invention

This invention relates generally to synchronization of objects and relates more particularly to a system and method for synchronization of version annotated objects.

2. Description of the Background Art

Various types of data are stored in computers such as servers and desktop personal computers (PCs) that are not generally considered mobile devices. Some types of data, for example contact information, are commonly stored both in a non-mobile computer and a mobile device such as a personal digital assistant (PDA) or other handheld computer or device. It is often desirable and necessary to synchronize the data in a non-mobile computer and a mobile device. In general, data synchronization involves change identification, conflict detection, and conflict resolution. Various techniques exist for accomplishing these aspects of data synchronization, including (1) comparing the data object by object for changes and differences, (2) logging changes made at each device, exchanging logs, and applying changes from each device's log to the other device, and (3) comparing objects in each device against objects in a history file that reflects the data in each device at the completion of the last synchronization.

Data synchronization often occurs in a single-user context where the data is typically stored in only two devices, a mobile device such as a PDA and a non-mobile device such as a desktop PC. Synchronization of single-user data is typically straightforward since only two sets of data need to be synchronized. Synchronization of multiple-user data that resides in more than two databases presents more of a challenge. Multiple users of data increase the likelihood of conflicts between the different databases and complicate the resolution of such conflicts.

SUMMARY OF THE INVENTION

In accordance with the present invention, a system and method are disclosed to implement synchronization of version annotated objects. The invention includes objects stored in a master database and objects stored in a replicated database. The master database is coupled to an application server and the replicated database resides in a remote device. The remote device communicates with the application server via a network. A synchronization (sync) server at the application server and a sync processor at the remote device operate in conjunction as a distributed software application to synchronize the master database with the replicated database. After synchronization, the objects in the replicated database are identical to the objects in the master database. A plurality of replicated databases may be synchronized with the master database.

The objects in the master database and in the replicated database include identifiers and version stamps. In one embodiment, the identifiers and version stamps are of type integer. During synchronization, the sync processor sends update requests to the sync server, where each update request includes an identifier, a version stamp, and before and after values of a changed property. The sync server compares the version stamp of each update request with the version stamp of the corresponding object in the master database. If the version stamps match, then the sync server updates the object in the master database according to the update request. If the version stamps do not match, then the sync server resolves the conflict according to business application rules. The result of conflict resolution is either an update to the object in the master database, an update to the object in the replicated database, or the creation of a new object that reflects a merging of changed properties from the conflicting objects. The sync server then compares the version stamps of the objects in the master database with the version stamps of the objects in the replicated database and replaces any out-of-date objects in the replicated database with copies of the up-to-date objects from the master database.

DETAILED DESCRIPTION OF THE INVENTION

Figure 1:
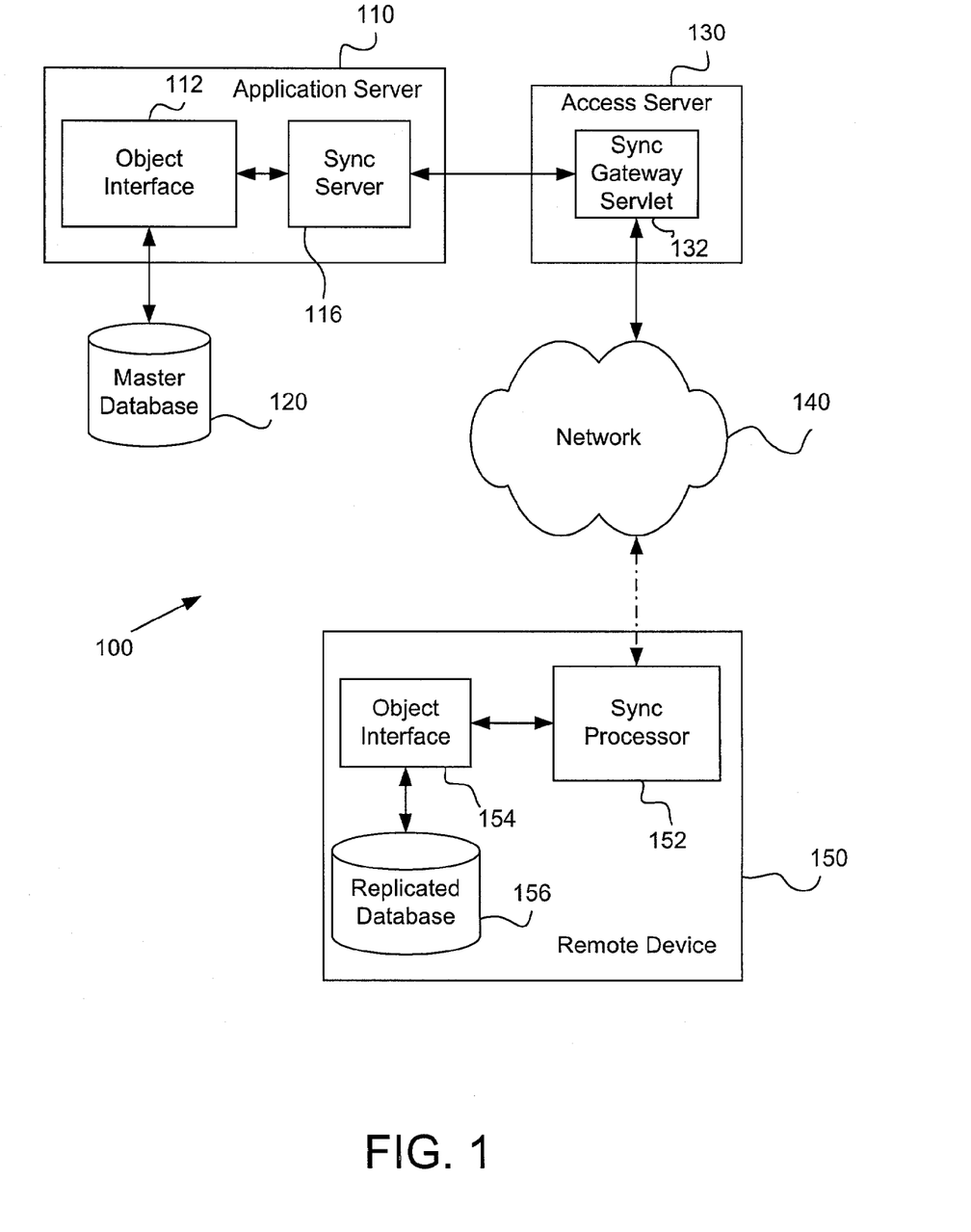
FIG. 1 is a block diagram of one embodiment for an electronic network system according to the present invention.

FIG. 1 is a block diagram of one embodiment of an electronic network system 100 according to the present invention. System 100 includes, but is not limited to, an application server 110, a master database 120, an access server 130, a network 140, and a remote device 150. Application server 110 includes, but is not limited to, an object interface 112 and a synchronization (sync) server 116. Object interface 112 provides an interface between sync server 116 and business objects (not shown) stored in master database 120. Access server 130 includes, but is not limited to, a sync gateway servlet 132 which is configured to communicate with sync server 116 and network 140. In one embodiment, access server 130 is implemented as a web server.

Remote device 150 includes, but is not limited to, a replicated database 156, an object interface 154, and a sync processor 152. Remote device 150 may be embodied as any type of remote electronic device including, but not limited to, a personal computer, a laptop computer, or a handheld electronic device such as a personal digital assistant, a mobile telephone, or a text messaging device. Network 140 may be embodied as any type of network, including, but not limited to, a public switched telephone network (PSTN), a Local Area Network (LAN), a Wide Area Network (WAN), a public network such as the Internet, a broadband network, a wireless network, or a combination of any or all of these network types. In FIG. 1, a solid line representing the connection between access server 130 and network 140 indicates that the connection is continuously maintained, and a dashed line representing the connection between remote device 150 and network 140 indicates that the connection is temporary. Sync processor 152 communicates via network 140 and sync gateway servlet 132 to sync server 116 of application server 110. Sync processor 152 and sync server 116 operate in conjunction as a distributed software application that synchronizes business objects (not shown) stored in replicated database 156 with business objects (not shown) stored in master database 120. Object interface 154 provides an interface between sync processor 152 and the business objects stored in replicated database 156. Although only one remote device 150 is shown in FIG. 1, system 100 may include any number of remote devices configured to communicate with application server 110 to synchronize any number of replicated databases with master database 120.

In the FIG. 1 embodiment, the contents of master database 120 are accessible by multiple users of remote devices such as remote device 150. Business objects stored in replicated database 156 are periodically synchronized with business objects stored in master database 120. This allows the multiple users to utilize and make changes to (update) the contents of master database 120.

Figure 2:
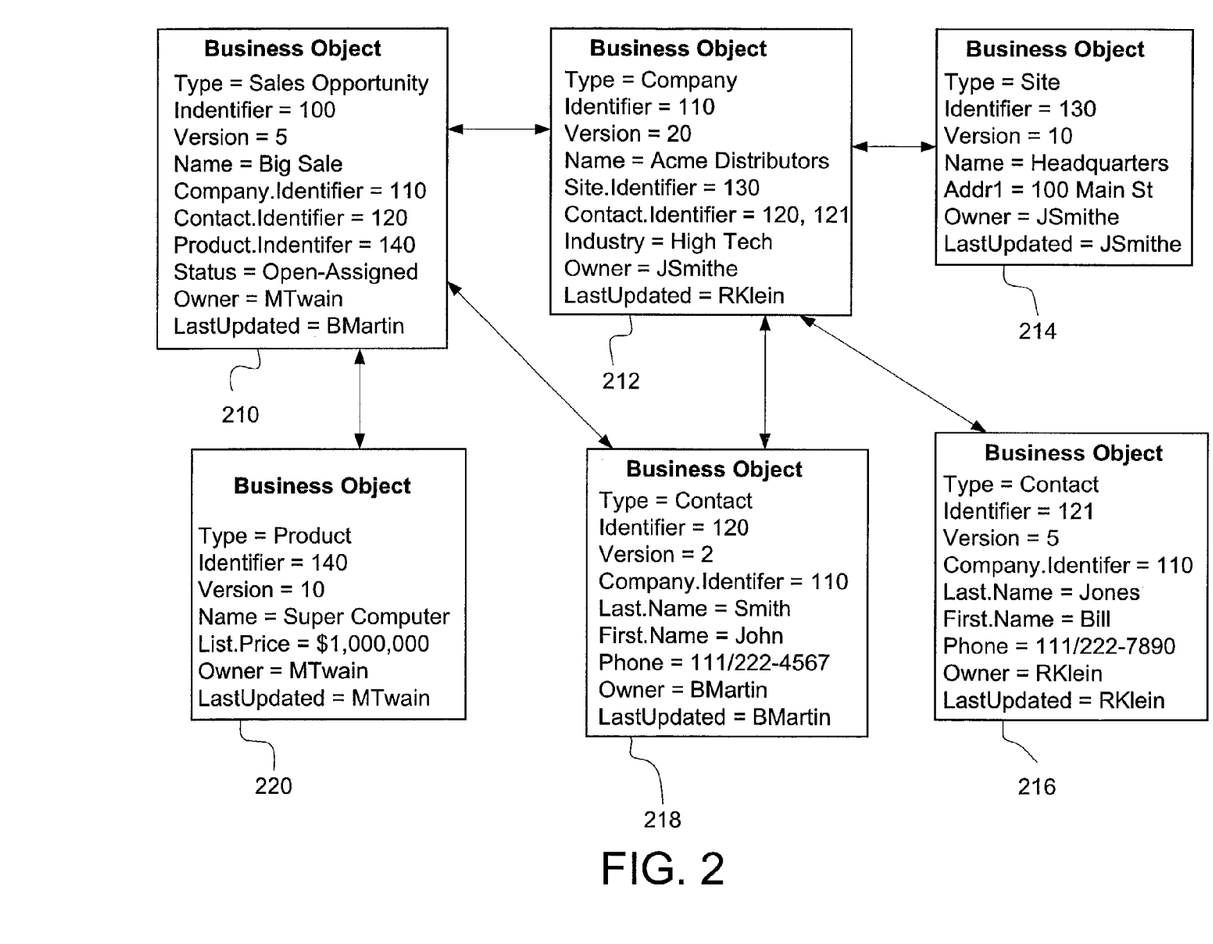
FIG. 2 is a diagram of one embodiment of business objects in the master database of FIG. 1 according to the invention.

FIG. 2 is a diagram of one embodiment of business objects in master database 120 of FIG. 1 according to the invention. Although only six business objects are shown in FIG. 2, master database 120 may contain any number of business objects and any type of data object is within the scope of the invention. In the FIG. 2 embodiment, each business object in master database 120 has the properties type, identifier, version, owner, and last updated. Other properties present in each business object depend upon the type. A business object 210 is of type sales opportunity and has an identifier of 100 and a version stamp of 5. Business object 210 also includes the properties name, company identifier, contact identifier, product identifier, and status. Business object 210 references three other business objects in master database 120, namely business objects 212, 218, and 220.

Business object 212 is of type company and has an identifier of 110 and a version stamp of 20. Business object 212 also includes the properties name, site identifier, contact identifier, and industry. Business object 212 references business objects 214, 216, and 218. Business object 214 is of type site and has an identifier of 130 and a version stamp of 10. Business object 214 also includes the properties name and address (addr1). Business object 216 is of type contact and has an identifier of 121 and a version stamp of 5. Business object 216 also includes the properties company identifier, last name, first name, and phone. Business object 218 is also of type contact and has an identifier of 120 and a version stamp of 2. Business object 218 includes the properties company identifier, last name, first name, and phone. Business objects of the same type typically include the same number and kind of properties. Business object 220 is of type product and has an identifier of 140 and a version stamp of 10. Business object 220 also includes the properties name and list price.

In the FIG. 2 embodiment, the identifier and version stamp properties are of data type integer; however any other data types that exhibit a reliable ordering, for example character and date/time, are within the scope of the invention. In the preferred embodiment, version stamps are identified by date/timestamps, which are readily available without a database read operation and thus optimize performance. When comparing business objects having identical identifiers, identical date/timestamps indicate identical versions, and if the timestamps are not identical, a later date/timestamp indicates a newer version. Sync server 116 assigns an identifier and a version stamp to each new business object, and each business object's identifier is unique and does not change during the existence of that business object or any of its replicas. In the preferred embodiment, unique identifiers are determined by a combination of object type and identifier properties, which simplifies identifier assignments for new object instances. A user of remote device 150 is able to change properties in business objects stored in replicated database 156, except for the identifier and version stamp properties, which are modifiable only by sync server 116. Business objects originally created in replicated database 156 are assigned an identifier or version stamp during synchronization with master database 120. Sync server 116 increments the version stamp of a business object each time that business object is updated in master database 120.

Figure 3:
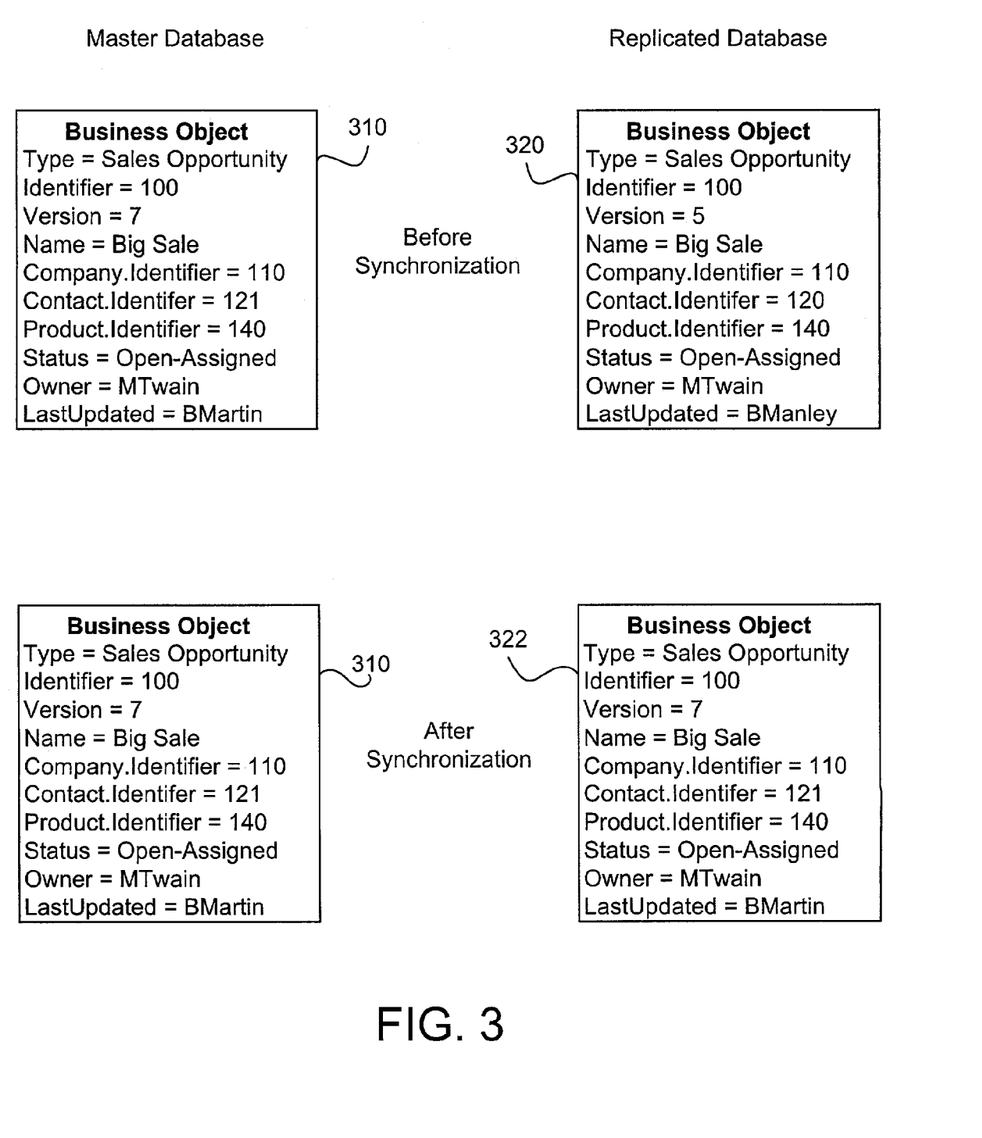
FIG. 3 is a diagram of exemplary business objects in the master database and the replicated database of FIG. 1 before and after synchronization, according to one embodiment of the invention.

FIG. 3 is a diagram of exemplary business objects in master database 120 and replicated database 156 of FIG. 1 before and after synchronization, according to one embodiment of the invention. In the FIG. 3 embodiment, the user of remote device 150 has not made any changes to business objects in replicated database 156 since replicated database 156 was last synchronized with master database 120. Before synchronization, a business object 310 in master database 120 has an identifier of 100, a version stamp of 7, and a contact identifier of 121. A corresponding business object 320 in replicated database 156 has an identifier of 100, a version stamp of 5, and a contact identifier of 120. Business object 310 and business object 320 have different version stamps. The version stamp of business object 310 is higher than the version stamp of business object 320, which means that business object 310 in master database 120 has been updated since it was copied to replicated database 156 in remote device 150. During synchronization, sync server 116 and sync processor 152 recognize that business object 320 in replicated database 156 is out of date, and sync server 116 sends a copy (a business object 322) of business object 310 to remote device 150, where sync processor 152 replaces business object 320 with business object 322. After synchronization, business object 322 in replicated database 156 is identical to business object 310 in master database 120, as is shown in FIG. 3.

Figure 4:
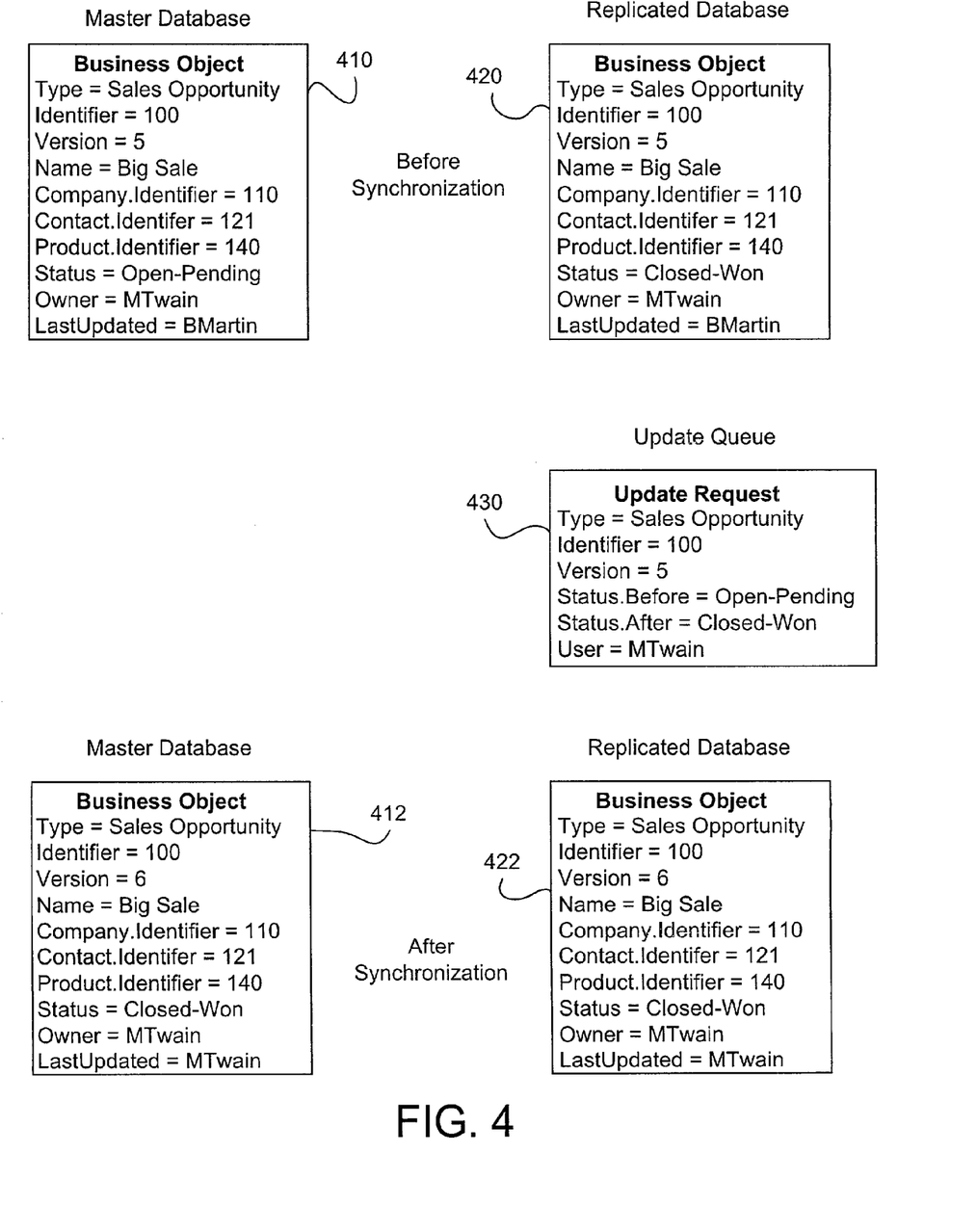
FIG. 4 is a diagram of exemplary business objects in the master database and the replicated database of FIG. 1 before and after synchronization, according to another embodiment of the invention.

FIG. 4 is a diagram of exemplary business objects in master database 120 and replicated database 156 of FIG. 1 before and after synchronization, according to another embodiment of the invention. A business object 410 in master database 120 has an identifier of 100 and a version stamp of 5. A corresponding business object 420 in replicated database 156 also has an identifier of 100 and a version stamp of 5. However, business object 420 has been changed by the user (MTwain) of remote device 150; specifically, the status of business object 420 is now "Closed-Won." When business object 420 was changed in replicated database 156, sync processor 152 created and stored an update request 430 in an update queue in remote device 150. Update request 430 includes the identifier and version stamp of changed business object 420, the before and after values of the changed property(ies), and the user of remote device 150.

During synchronization, sync processor 152 communicates any update requests in the update queue to sync server 116. Sync server 116 compares each update request in the update queue with the corresponding business object in master database 120, that is, the business object in master database 120 having the same identifier as the update request. In the FIG. 4 embodiment, sync server 116 compares update request 430 with business object 410 because both have an identifier of 100. Since business object 410 and update request 430 both have a version stamp of 5, there is no conflict and sync server 116 updates business object 410 according to update request 430 and increments the version stamp to 6, essentially replacing business object 410 with business object 412. Sync server 116 and sync processor 152 then communicate to replace business object 420 with a copy (a business object 422) of business object 412 in replicated database 156. After synchronization, business object 422 in replicated database 156 is identical to business object 412 in master database 120.

Figure 5:
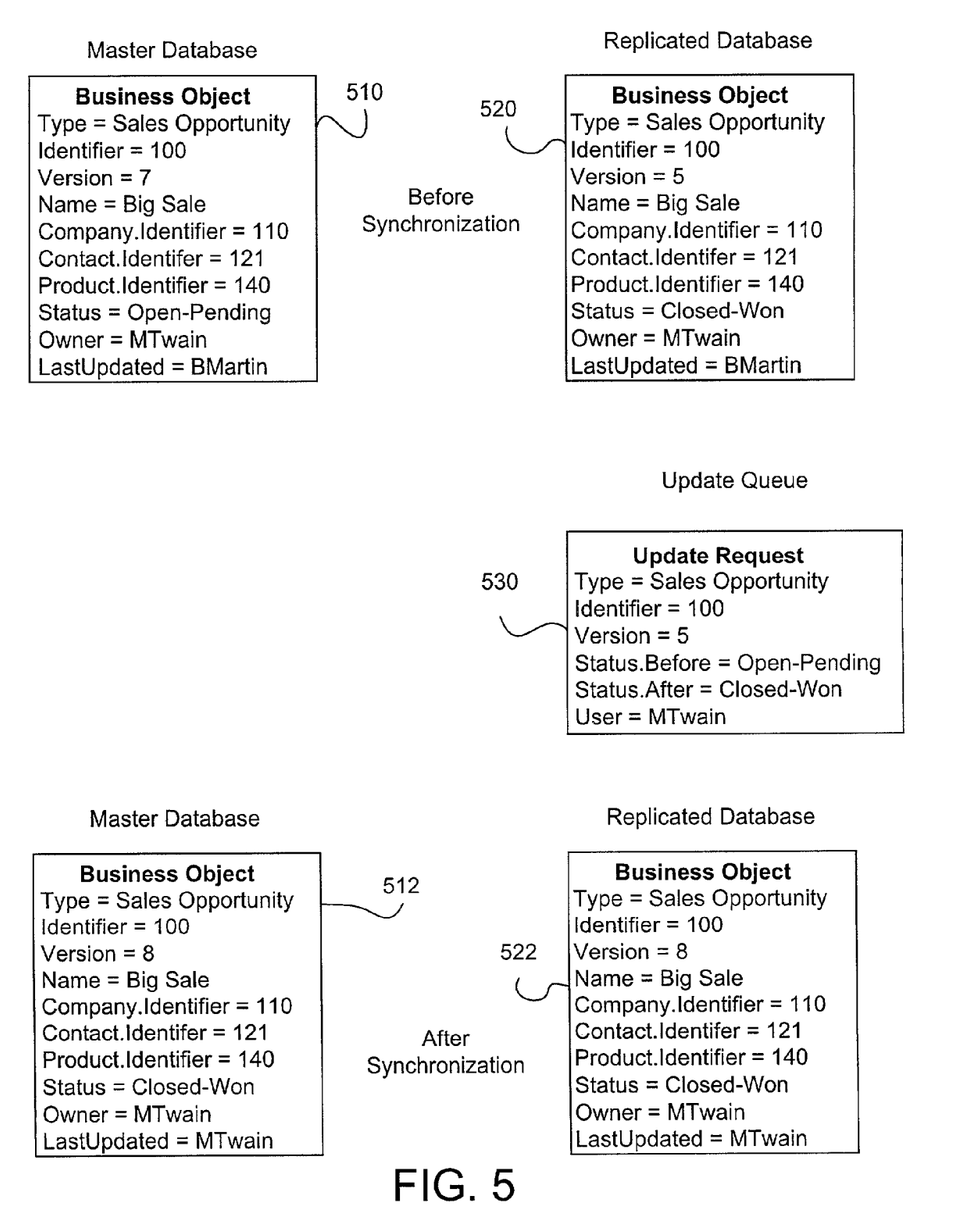
FIG. 5 is a diagram of exemplary business objects in the master database and the replicated database of FIG. 1 before and after synchronization, according to another embodiment of the invention.

FIG. 5 is a diagram of exemplary business objects in master database 120 and replicated database 156 of FIG. 1 before and after synchronization, according to another embodiment of the invention. A business object 510 in master database 120 has an identifier of 100 and a version stamp of 7. A business object 520 in replicated database 156 has an identifier of 100 and a version stamp of 5. In the FIG. 5 embodiment, two updates of business object 510 have occurred since replicated database 156 was last synchronized with master database 120. Also, business object 520 has been changed by a user (Mtwain) of remote device 150; specifically, the status of business object 520 is now "Closed-Won." Sync processor 152 has created and stored an update request 530 in the update queue of remote device 150. Update request 530 includes the identifier and version stamp of changed business object 520, the before and after values of the changed property(ies), and the identity of the user (MTwain) of remote device 150.

During synchronization, sync processor 152 communicates any update requests in the update queue to sync server 116. Sync server 116 compares each update request in the update queue with the corresponding business object in master database 120. In the FIG. 5 embodiment, sync server 116 compares update request 530 with business object 510 because both have an identifier of 100. Since business object 510 has a version stamp of 7 and update request 530 has a version stamp of 5, a conflict exists. Sync server 116 resolves the conflict using conflict resolution rules to determine what object property values should be retained for the synchronization. The result of conflict resolution is either an update to the object in the master database, an update to the object in the replicated database, or the creation of a new object that reflects a merging of changed properties from the conflicting objects. Different business applications will apply different rules to resolve update conflicts. Rules are based on processes of a business application domain of system 100. For example, in a sales force automation application, an exemplary conflict resolution rule states that an update to a business object of type sales opportunity by the object owner overrides an update by anyone else. So, if business object 510 was last updated by BMartin and update request 530 is from MTwain's remote device 150, sync server 116 updates the status of business object 510 to "Closed-Won" and increments the version stamp to 8, resulting in business object 512, which replaces business object 510 in master database 120. Sync server 116 and sync processor 152 then replace business object 520 with a copy (a business object 522) of the business object 512 in replicated database 156. After synchronization, business object 512 in master database 120 and business object 522 in replicated database 156 are identical.

In situations where a conflict cannot be resolved according to the conflict resolution rules, the object in replicated database 156 and the object in master database 120 are not synchronized and the user of remote device 150 is notified. The user may then choose to accept the values of the object in master database 120, override the values of the object in master database 120 with the values of the update request, or generate a new update request. For the latter choice, sync processor 152 replaces the changed object in replicated database 156 with a copy of the corresponding object from master database 120, which has an up-to-date version stamp, and the user may change the property of the object in replicated database 156 to another value, and sync processor 152 creates another update request. The other value may be based on the value of the conflicting corresponding object in master database 120. In one example, the original update request changed the value of a confidence level property for a sales object to ninety percent. This update request conflicted with the corresponding object in master database 120, in which the confidence level property is fifty percent. The corresponding object in master database 120 also includes a comment that the prospective buyer is seriously considering purchasing a competitor's product. In view of this comment and the user's own knowledge, the user then changes the value of the confidence level property of the object in replicated database 156 to thirty percent and sync processor 152 generates a new update request. If there has not been an intervening update to the corresponding object in master database 120 by a different user, then the new update request is applied to the corresponding object in master database 120 the next time replicated database 156 is synchronized with master database 120. If there has been an intervening update to the corresponding object in master database 120 by a different user, then the next time replicated database 156 is synchronized with master database 120 the version stamp of the corresponding object in master database 120 will not match the version stamp of the new update request and a new conflict will be detected by sync server 116.

Figure 6:
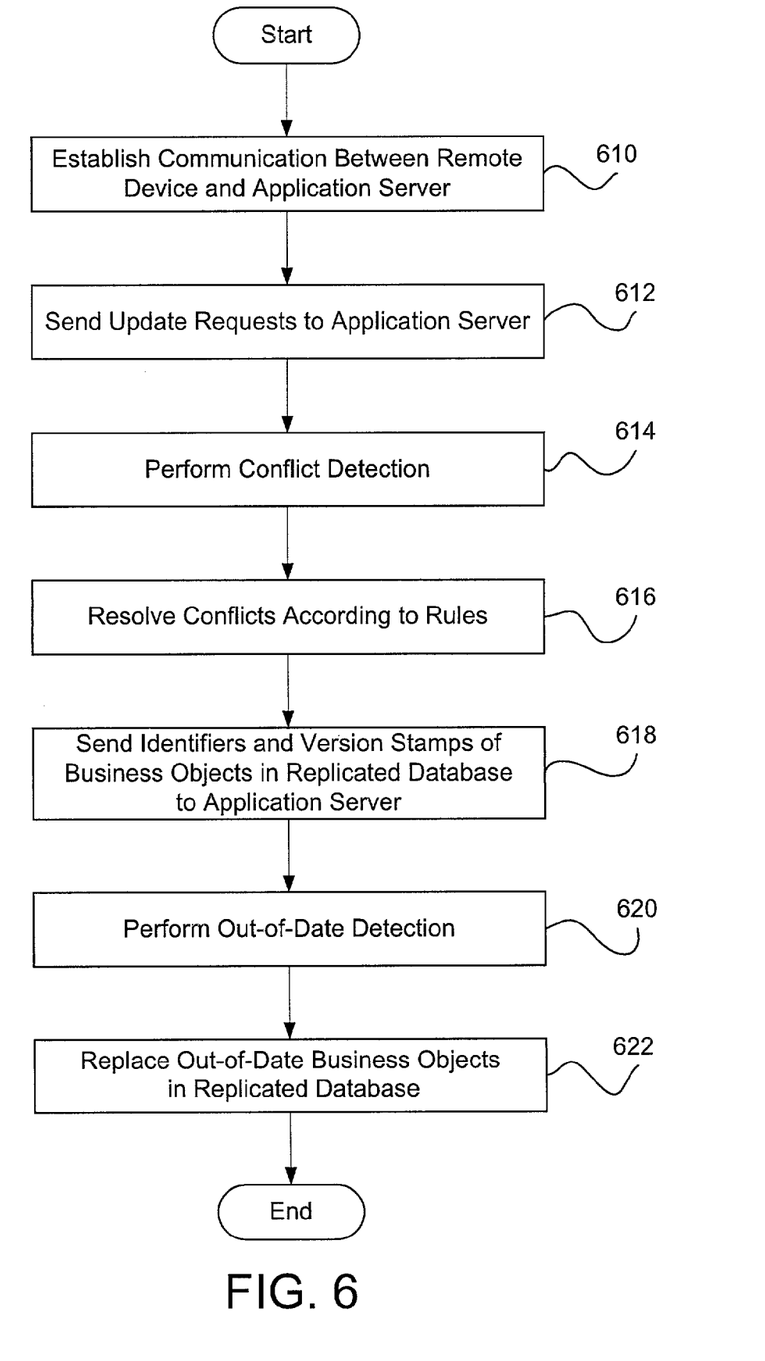
FIG. 6 is a flowchart of method steps for synchronizing business objects according to one embodiment of the invention.

FIG. 6 is a flowchart of method steps for synchronizing business objects according to one embodiment of the invention. Although the method steps of FIG. 6 are described in the context of system 100 of FIG. 1, other systems configured to perform the method steps are within the scope of the invention. First, in step 610, remote device 150 establishes communications with application server 110. In step 612, sync processor 152 sends any update requests in the update queue of remote device 150 to sync server 116. In step 614, sync server 116 performs conflict detection for the business objects identified in the update requests. Sync server 116 compares the version stamps of the update requests with the version stamps of the corresponding business objects in master database 120. If the version stamps match, there is no conflict and sync server 116 updates the business objects in master database 120 accordingly and increments the version stamps. If the version stamps do not match, then a conflict exists. In step 616, sync server 116 resolves any conflicts according to conflict resolution rules. The content of the rules typically depends upon the types of business objects stored in system 100. In other embodiments, steps 612, 614, and 616 are optional, for example where the user of remote device 150 has made no changes to replicated database 156 such that the update queue is empty.

In step 618, sync processor 152 sends identifiers and version stamps of the business objects stored in replicated database 156 to application server 110. In step 620, sync server 116 performs out-of-date detection by comparing the version stamps of the business objects in master database 120 with the version stamps received from sync processor 152. Then, in step 622, sync server 116 in conjunction with sync processor 152 replaces out-of-date business objects in replicated database 156 with copies of up-to-date corresponding business objects from master database 120. During this step, sync server 116 may also send to replicated database 156 copies of business objects that are new to master database 120 since the last synchronization with remote device 150.

Figure 7:
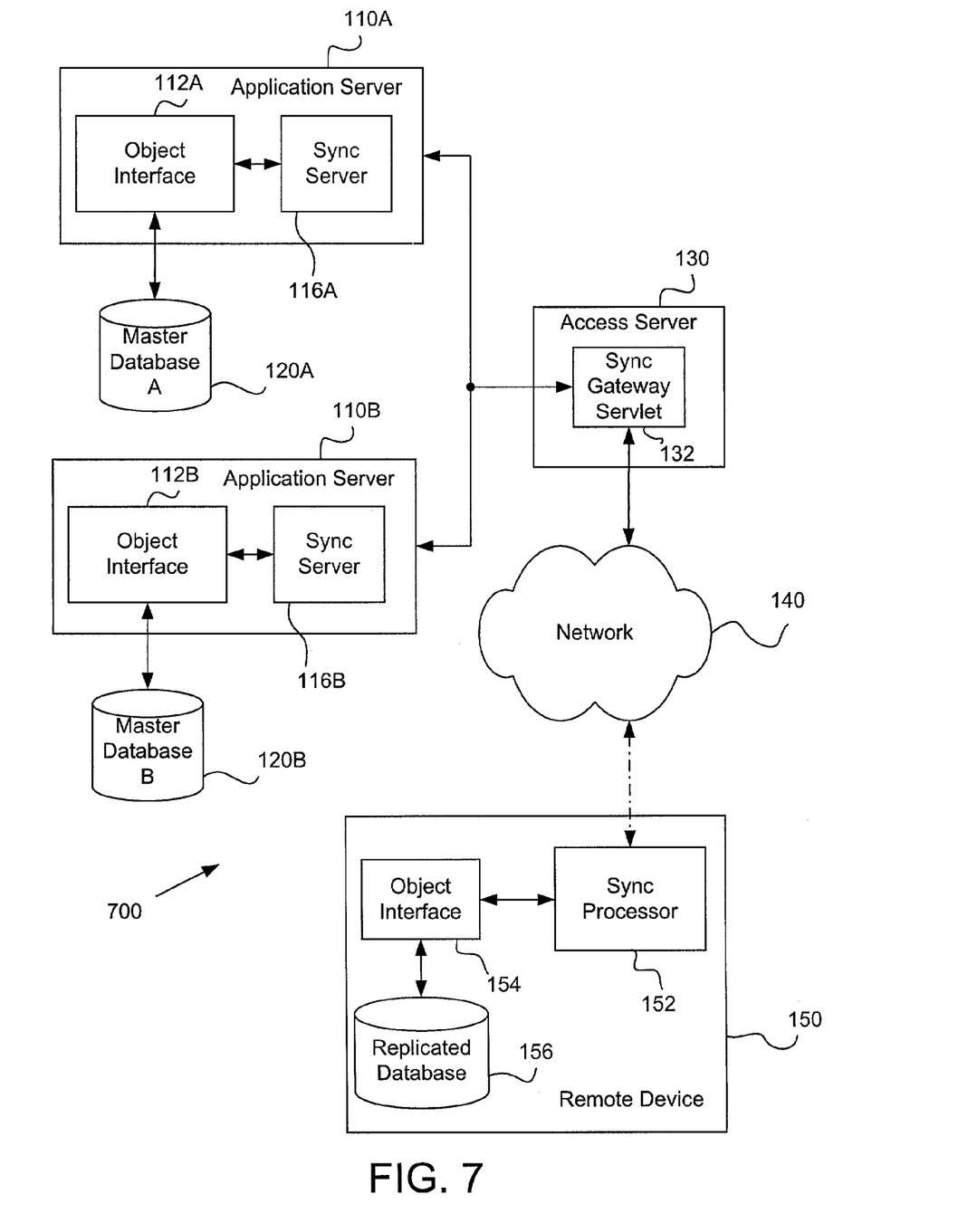
FIG. 7 is a block diagram of another embodiment of the electronic network system of FIG. 1, according to the invention.

FIG. 7 is a block diagram of another embodiment 700 of the electronic network system of FIG. 1, according to the invention. System 700 of FIG. 7 includes two application servers 110A and 110B. Application server 110A is coupled to a master database A 120A, and application server 110B is coupled to a master database B 120B. Application servers 110A and 110B and master database A 120A and master database B 120B may be at the same physical location or may be at different physical locations, for instance when an organization uses physical database separation as a data security measure. In the FIG. 7 embodiment, master database A 120A and master database B 120B each contain object types unique to the respective databases. For example, master database A 120A may contain human resource management objects such as employee records, employee contact information, and management organization information. Master database B 120B may contain customer relationship management objects such as sales leads, sales opportunities, and contact information. Replicated database 156 contains copies of objects from both master database A 120A and master database B 120B.

In the FIG. 7 embodiment, sync gateway servlet 132 performs a routing function to direct synchronization information to the appropriate application server and master database. Meta-data for each object includes an identifier signifying the master database for that object type. Synchronization messages, such as update requests, also carry this master database identifier so that sync gateway servlet 132 can route the synchronization messages to the appropriate application server.

Sync server 116 and sync processor 152 operate in conjunction as a distributed software application to efficiently synchronize multiple replicated databases 156 in multiple remote devices 150 with master database 120 using business object identifiers and version stamps. Identifiers and version stamps allow sync server 116 and sync processor 152 to perform out-of-date detection and conflict detection without requiring a change log or a history file. The system and method of the invention allow for efficient data synchronization while minimizing the size of a data set communicated between remote devices and server-based applications. Minimizing the size of the data set provides for a short synchronization elapsed time, especially on communication paths with low bandwidth, and low costs for transferring data along communication paths where charges are metered on data quantity.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for synchronization of business objects, comprising:
    a master database configured to store business objects, each business object having a version stamp and an identifier, wherein at least one of the business objects is updateable by a plurality of users;
    a plurality of replicated databases configured to store business objects, each business object in the plurality of replicated databases having a version stamp and an identifier, wherein the plurality of replicated databases are associated with the plurality of users, in response to an update of a business object in a first replicated database of the plurality of replicated databases, the first replicated database configured to generate an update request including a version stamp and an identifier of the updated business object, the update request stored in an update queue of the first replicated database; and
    a synchronization server configured to operate in conjunction with a synchronization processor to synchronize a business object in a first replicated database in the plurality of replicated databases with a corresponding business object in the master database, the update request stored in the update queue of the first replicated database being sent to the synchronization server in response to a synchronization request from a first user of the plurality of users,
    wherein if a conflict exists between the business object in the first replicated database included in the update request and the corresponding business object in the master database, the synchronization server is configured to resolve the conflict according to at least one conflict resolution rule configured to override the update by one of the first and second users based on a priority of one of the first and second users over the other of the first and second users, and to send, to one or one or more of the plurality of replicated databases, a copy of the corresponding business object updated according to the at least one conflict resolution rule.

2. The system of claim 1, wherein the synchronization server and the synchronization processor operate in conjunction as a distributed software application.

3. The system of claim 1, wherein the master database is coupled to an application server that includes the synchronization server.

4. The system of claim 3, further comprising a second master database coupled to a second application server that includes a second synchronization server.

5. The system of claim 1, wherein the first replicated database and the synchronization processor reside in a first remote device and the second replicated database and the synchronization processor reside in a second remote device.

6. The system of claim 5, wherein the synchronization processor is configured to communicate with the synchronization server via a network.

7. The system of claim 5, wherein at least one of the first remote device and the second remote device is a personal computer.

8. The system of claim 5, wherein at least one of the first remote device and the second remote device is a handheld device.

9. The system of claim 5, wherein at least one of the first remote device and the second remote device is a mobile telephone.

10. The system of claim 1, wherein the synchronization server is configured to perform out-of-date detection using identifiers and version stamps of the objects in the master database and identifiers and version stamps of the objects in the replicated database to determine whether any of the objects in the replicated database are out-of-date.

11. The system of claim 10, wherein the synchronization server is configured to perform out-of-date detection by comparing version stamps of the objects in the replicated database with version stamps of corresponding objects in the master database to determine whether any of the objects in the replicated database are out-of-date, and the synchronization server and the synchronization processor are configured to replace an out-of-date object in the replicated database with a copy of an up-to-date object in the master database.

12. The system of claim 11, wherein the version stamp of each object in the first replicated database is a date/timestamp and the version stamp of each object in the master database is a date/timestamp.

13. The system of claim 11, wherein the version stamp of each object in the first replicated database is an integer and the version stamp of each object in the master database is an integer.

14. The system of claim 11, wherein the version stamp of each object in the first replicated database is a character and the version stamp of each object in the master database is a character.

15. The system of claim 1, wherein the synchronization processor is configured to create the update request.

16. The system of claim 15, wherein the synchronization server is configured to perform update conflict detection using the identifier and the version stamp of the update request.

17. The system of claim 16, wherein the synchronization server is configured to perform update conflict detection by comparing the version stamp of the corresponding object in the master database with the version stamp of the update request to determine if an update conflict exists.

18. The system of claim 17, wherein an update conflict exists if the version stamp of the update request does not match the version stamp of the corresponding object in the master database.

19. The system of claim 17, wherein the synchronization server is configured to update the corresponding object in the master database and to copy the updated object to the replicated database if no update conflict exists.

20. The system of claim 19, wherein the synchronization server is configured to increment the version stamp of the updated object.

21. The system of claim 17, wherein if the conflict exists and if the synchronization server cannot resolve the conflict, the synchronization server is further configured to communicate with the synchronization processor to notify a user of the replicated database that the conflict was not resolved.

22. The system of claim 17, wherein the version stamp of each object in the replicated database is a date/timestamp and the version stamp of each object in the master database is a date/timestamp.

23. The system of claim 17, wherein the version stamp of each object in the replicated database is an integer and the version stamp of each object in the master database is an integer.

24. The system of claim 17, wherein the version stamp of each object in the replicated database is a character and the version stamp of each object in the master database is a character.

25. The system of claim 1, wherein the at least one conflict resolution rule is based on processes of a business application domain of the system.

26. The system of claim 1, wherein the at least one conflict resolution rule is based on ownership of the corresponding object in the master database.

27. The system of claim 1, wherein the synchronization server is configured to increment the version stamp of an object in the master database if that object has been updated.

28. A method for synchronizing objects, comprising the steps of:
   receiving an update request from a first user at a synchronization server, the update request including an identifier and a version stamp for an object in a first replicated database and an identity of the first user;
   comparing the identifier and the version stamp of the update request with an identifier and a version stamp of an object in a master database to determine whether a conflict exists, wherein the object is updateable by a plurality of users, wherein a plurality of replicated databases are associated with the plurality of users; and
   if a conflict exists where an update to an object in the master database has been performed by a second user in the plurality of users,
      resolving the conflict according to at least one conflict resolution rule configured to override the update by one of the first and second users based on a priority of one of the first and second users over the other of the first and second users an identity of at least one of the first and second users, where the version stamp of the update request and the version stamp of the object in the master database provide update sequence information that is used to determine if the conflict exists;
   updating the object in the master database; and
      sending a copy of the updated object updated according to the at least one conflict resolution rule to the first replicated database in the plurality of replicated databases.

29. The method of claim 28, wherein the step of updating the object includes incrementing the version stamp of the object.

30. The method of claim 28, wherein the update request includes a before value and an after value of a changed property.

31. The method of claim 28, wherein the master database is coupled to an application server that includes the synchronization server.

32. The method of claim 28, wherein the first replicated database is coupled to a first remote device and the second replicated database is coupled to a second remote device.

33. The method of claim 32, wherein the first replicated database communicates with the synchronization server via a network.

34. The method of claim 32, wherein the first remote device includes a synchronization processor configured to access the first replicated database.

35. A method for synchronizing objects, comprising the steps of:
   changing an object in a first replicated database for a first user;
   creating an update request having an identifier and a version stamp that corresponds to an identifier and a version stamp of the changed object in the replicated database, the update request further including an identity of the first user;
   sending the update request to a server including a master database, wherein an object in the master database is updateable by a plurality of users, wherein a plurality of replicated databases are associated with the plurality of users, wherein if an update to the object has been performed by a second user, the synchronization server is configured to resolve the conflict according to at least one conflict resolution rule configured to override the update by one of the first and second users based on a priority of one of the first and second users over the other of the first and second users;
   receiving an object from the server in response to the update request updated according to the at least one conflict resolution rule; and replacing the changed object in the replicated database with the object from the server.

36. The method of claim 35, wherein the update request includes a before status and an after status of a changed field.

37. The method of claim 35, wherein the object from the server is a copy of an updated object that corresponds to the changed object in the replicated database.

38. A system for synchronizing objects, comprising:
a computer processor; and
a computer memory including instructions that, when executed by the processor, provides:
  means for changing an object in a first replicated database associated with a first user;
  means for creating an update request having an identifier and a version stamp that corresponds to an identifier and a version stamp of the changed object in the first replicated database, the update request further including an identity of the first user;
  means for sending the update request to a server;
  means for receiving the update request at the server;
  means for comparing the identifier and the version stamp of the update request with an identifier and a version stamp of a corresponding object in a master database, wherein the corresponding object in the master database is updateable by a plurality of users;
  means for determining if a conflict exists between the update request and the corresponding object in the master database;
  if an update to the object has been performed by a second user, means for resolving the conflict according to at least one conflict resolution rule configured to override the update by one of the first and second users based on a priority of one of the first and second users over the other of the first and second users;
  means for updating the corresponding object in the master database;
  means for sending a copy of the updated object to the replicated database;
  means for receiving, from the server, the copy of the updated object updated according to the at least one conflict resolution rule in response to the update request; and
  means for replacing the changed object in the replicated database with the copy of the updated object from the server.

39. A computer-readable medium comprising program instructions for synchronizing objects, by performing the steps of:
  receiving an update request from a first user at a synchronization server, the update request including an identifier and a version stamp for an object in a first replicated database, the update request further including an identity of the first user;
  comparing the identifier and the version stamp of the update request with an identifier and a version stamp of the object in a master database to determine whether a conflict exists, wherein the object is updateable by a plurality of users, wherein a plurality of replicated databases are associated with the plurality of users;
  if a conflict exists where an update to an object in the master database has been performed by a second user in the plurality of users,
    resolving the conflict according to at least one conflict resolution rule configured to override the update by one of the first and second users based on a priority of one of the first and second users over the other of the first and second users, where the version stamp of the update request and the version stamp of the object in the master database provide update sequence information that is used to determine if the conflict exists;
  updating the object in the master database; and
  sending a copy of the updated object updated according to the at least one conflict resolution rule to the first replicated database in the plurality of replicated databases.

40. The computer-readable medium of claim 39, wherein the step of updating the object includes incrementing the version stamp of the object.

41. The computer-readable medium of claim 39, wherein the update request includes a before value and an after value of a changed property.

42. The computer-readable medium of claim 39, wherein the master database is coupled to an application server that includes the synchronization server.

43. The computer-readable medium of claim 39, wherein the first replicated database is coupled to a first remote device and the second replicated database is coupled to a second remote device.

44. The computer-readable medium of claim 43, wherein the first replicated database communicates with the synchronization server via a network.

45. The computer-readable medium of claim 43, wherein the first remote device includes a synchronization processor configured to access the first replicated database.

* * * * *

UNITED STATES PATENT AND TRADEMARK OFFICE
CERTIFICATE OF CORRECTION

| | | |
|---|---|---|
| PATENT NO. | : 7,606,881 B2 | Page 1 of 1 |
| APPLICATION NO. | : 10/133164 | |
| DATED | : October 20, 2009 | |
| INVENTOR(S) | : Doug Chasman et al. | |

It is certified that error appears in the above-identified patent and that said Letters Patent is hereby corrected as shown below:

Title Pg, (*) Notice: delete "685 days" insert -- 1061 days --.

On sheet 2 of 7, in Figure 2, Box 210, line 3, delete "Indentifier" and insert -- Identifier --, therefor.

On sheet 2 of 7, in Figure 2, Box 210, line 8, delete "Indentifer" and insert -- Identifier --, therefor.

On sheet 2 of 7, in Figure 2, Box 218, line 5, delete "Identifer" and insert -- Identifier --, therefor.

On sheet 2 of 7, in Figure 2, Box 216, line 8, delete "Identifer" and insert -- Identifier --, therefor.

On sheet 3 of 7, in Figure 3, Box 310, line 7, delete "Identifer" and insert -- Identifier --, therefor.

On sheet 3 of 7, in Figure 3, Box 320, line 6, delete "Identifer" and insert -- Identifier --, therefor.

On sheet 3 of 7, in Figure 3, Box 322, line 7, delete "Identifer" and insert -- Identifier --, therefor.

On sheet 4 of 7, in Figure 4, Box 410, line 7, delete "Identifer" and insert -- Identifier --, therefor.

On sheet 4 of 7, in Figure 4, Box 420, line 7, delete "Identifer" and insert -- Identifier --, therefor On sheet 4 of 7, in Figure 4, Box 412, line 7, delete "Identifer" and insert -- Identifier --, therefor.

On sheet 4 of 7, in Figure 4, Box 422, line 7, delete "Identifer" and insert -- Identifier --, therefor.

On sheet 5 of 7, in Figure 5, Box 510, line 7, delete "Identifer" and insert -- Identifier --, therefor.

On sheet 5 of 7, in Figure 5, Box 520, line 7, delete "Identifer" and insert -- Identifier --, therefor.

In column 1, line 11, delete "mailer" and insert -- matter --, therefor.

Signed and Sealed this

Seventeenth Day of August, 2010

David J. Kappos
*Director of the United States Patent and Trademark Office*